United States Patent [19]

Brinkerhoff

[11] Patent Number: 5,464,044
[45] Date of Patent: Nov. 7, 1995

[54] SPRINKLER SYSTEM CONTROLLER

[76] Inventor: Joseph M. Brinkerhoff, 712 W. 200 South, Payson, Utah 84651

[21] Appl. No.: 286,418

[22] Filed: Aug. 5, 1994

[51] Int. Cl.⁶ ............................ F16K 17/36; A01G 25/16
[52] U.S. Cl. ................... 137/78.3; 239/64; 239/70
[58] Field of Search .............................. 137/78.2, 78.3; 239/64, 70

[56] References Cited

U.S. PATENT DOCUMENTS

| | | | |
|---|---|---|---|
| 4,197,866 | 4/1980 | Neal | 137/78.3 |
| 4,256,133 | 3/1981 | Coward et al. | 137/78.3 |
| 4,333,490 | 6/1982 | Enter, Sr. | 137/624.11 |
| 4,785,843 | 11/1988 | Nicholson | 137/78.3 |
| 4,892,113 | 1/1990 | Fattahi | 137/78.3 |
| 5,148,826 | 9/1992 | Bakhshaei | 137/78.3 |
| 5,207,380 | 5/1993 | Harryman | 137/78.3 |

*Primary Examiner*—A. Michael Chambers

[57] ABSTRACT

A sprinkler system controller comprising temperature sensor means for monitoring air temperature and transmitting an affirmative temperature indication signal when a given preset temperature is exceeded; light sensor means for monitoring light intensity and transmitting an affirmative illumination indication signal when a given preset intensity is not exceeded; moisture probe means for monitoring ground moisture and transmitting an affirmative moisture indication signal when a given preset moisture level is not exceeded; conjunctive means coupled to the temperature sensor means, light sensor means, and moisture probe means for transmitting an affirmative timer activation signal upon receipt of an affirmative temperature indication signal, an affirmative illumination indication signal, and an affirmative moisture indication signal; timer means coupled to the conjunctive means for receiving an affirmative timer activation signal and transmitting an affirmative sprinkler valve activation signal for a preset period of time upon its receipt; and water valve actuation means coupled to the timer means and adapted to be coupled to at least one water valve of a sprinkler line for opening the water valve when an affirmative sprinkler valve activation signal is received.

1 Claim, 4 Drawing Sheets

SPRINKLER SYSTEM CONTROLLER

BACKGROUND OF THE INVENTION

1. Field of the Invention

The present invention relates to a sprinkler system controller and more particularly pertains to automatically allowing the sprinkler system to irrigate an area of ground with a sprinkler system controller.

2. Description of the Prior Art

The use of sprinkler systems is known in the prior art. More specifically, sprinkler systems heretofore devised and utilized for the purpose of irrigating an area of ground are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,548,225 to Busalacchi discloses an irrigation control system. U.S. Pat. No. 4,718,446 to Simpson discloses a time and moisture responsive sprinkler control system. U.S. Pat. No. 5,021,939 to Pulgiese discloses a computerized sprinkler control system. U.S. Pat. No. 5,207,380 to Harryman discloses an irrigation control system.

While these devices fulfill their respective, particular objective and requirements, the aforementioned patents do not describe a sprinkler system controller that uses light, temperature, and moisture sensors for controlling the actuation of sprinklers of a sprinkler system.

In this respect, the sprinkler system controller according to the present invention substantially departs from the conventional concepts and designs of the prior art, and in doing so provides an apparatus primarily developed for the purpose of automatically allowing the sprinkler system to irrigate an area of ground.

Therefore, it can be appreciated that there exists a continuing need for new and improved sprinkler system controller which can be used for automatically allowing the sprinkler system to irrigate an area of ground. In this regard, the present invention substantially fulfills this need.

SUMMARY OF THE INVENTION

In the view of the foregoing disadvantages inherent in the known types of sprinkler systems now present in the prior art, the present invention provides an improved sprinkler system controller. As such, the general purpose of the present invention, which will be described subsequently in greater detail, is to provide a new and improved sprinkler system controller and method which has all the advantages of the prior art and none of the disadvantages.

To attain this, the present invention essentially comprises, in combination, a power supply for supplying electrical energy. A temperature sensor is coupled to a power supply with the temperature sensor having a thermistor for monitoring air temperature in a ground area to be irrigated and a comparator coupled thereto for transmitting an affirmative temperature indication signal when a given preset temperature as recognized by the thermistor is exceeded and a non-affirmative temperature indication signal otherwise. A light sensor is coupled to the power supply with the light sensor having a photodetector for monitoring light intensity in a ground area to be irrigated and a comparator with inverter coupled thereto for transmitting an affirmative illumination indication signal when a given preset intensity as recognized by the photodetector is not exceeded and a non-affirmative illumination indication signal otherwise. A plurality of moisture probes are included with each coupled to the power supply and each having a variable resistor for monitoring moisture in a ground area to be irrigated and a comparator coupled thereto for transmitting an affirmative moisture indication signal when a given preset moisture level as recognized by the variable resistor is not exceeded and a non-affirmative moisture indication signal otherwise. A plurality of timers are included with each coupled to the power supply. Each has an input and an output with each input adapted to receive an affirmative timer activation signal and each output transmitting an affirmative sprinkler valve activation signal for a preset period of time upon receipt of an affirmative timer activation signal, and each output transmitting and a non-affirmative sprinkler valve activation signal otherwise. Conjunctive circuitry is coupled to the power supply and further coupled to the temperature sensor, light sensor, moisture probes, and timers with the conjunctive circuitry transmitting an affirmative timer activation signal upon receipt of an affirmative temperature indication signal, an affirmative illumination indication signal, and an affirmative moisture indication signal, with a constraint that no affirmative sprinkler valve activation signal is currently being received. A plurality of triacs are included with each triac coupled to the power supply and an output of a separate timer. Each triac transmits an affirmative sprinkler line activation signal when an affirmative sprinkler valve activation signal is received and a non-affirmative sprinkler line activation signal otherwise. The affirmative sprinkler line activation signal is adapted to open a solenoid water valve coupled to a sprinkler line, whereby allowing a sprinkler head coupled to the sprinkler line to disperse water for irrigating an area of ground. The non-affirmative sprinkler line activation signal is adapted to close an opened solenoid water valve coupled to a sprinkler line, whereby preventing a sprinkler head coupled to the sprinkler line from dispersing water.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved sprinkler system controller which has all the advantages of the prior art sprinkler systems and none of the disadvantages.

It is another object of the present invention to provide a new and improved sprinkler system controller which may be easily and efficiently manufactured and marketed.

It is a further object of the present invention to provide a new and improved sprinkler system controller which is of durable and reliable construction.

An even further object of the present invention is to provide a new and improved sprinkler system controller which is susceptible of a low cost of manufacture with regard to both materials and labor, and which accordingly is then susceptible of low prices of sale to the consuming public, thereby making such a sprinkler system controller economically available to the buying public.

Still yet another object of the present invention is to provide a new and improved sprinkler system controller which provides in the apparatuses and methods of the prior art some of the advantages thereof, while simultaneously overcoming some of the disadvantages normally associated therewith.

Even still another object of the present invention is to provide a new and improved sprinkler system controller for automatically allowing the sprinkler system to irrigate an area of ground.

Lastly, it is an object of the present invention to provide a new and improved sprinkler system controller comprising temperature sensor means for monitoring air temperature and transmitting an affirmative temperature indication signal when a given preset temperature is exceeded; light sensor means for monitoring light intensity and transmitting an affirmative illumination indication signal when a given preset intensity is not exceeded; moisture probe means for monitoring ground moisture and transmitting an affirmative moisture indication signal when a given preset moisture level is not exceeded; conjunctive means coupled to the temperature sensor means, light sensor means, and moisture probe means for transmitting an affirmative timer activation signal upon receipt of an affirmative temperature indication signal, an affirmative illumination indication signal, and an affirmative moisture indication signal; timer means coupled to the conjunctive means for receiving an affirmative timer activation signal and transmitting an affirmative sprinkler valve activation signal for a preset period of time upon its receipt; and water valve actuation means coupled to the timer means and adapted to be coupled to at least one water valve of a sprinkler line for opening the water valve when an affirmative sprinkler valve activation signal is received.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
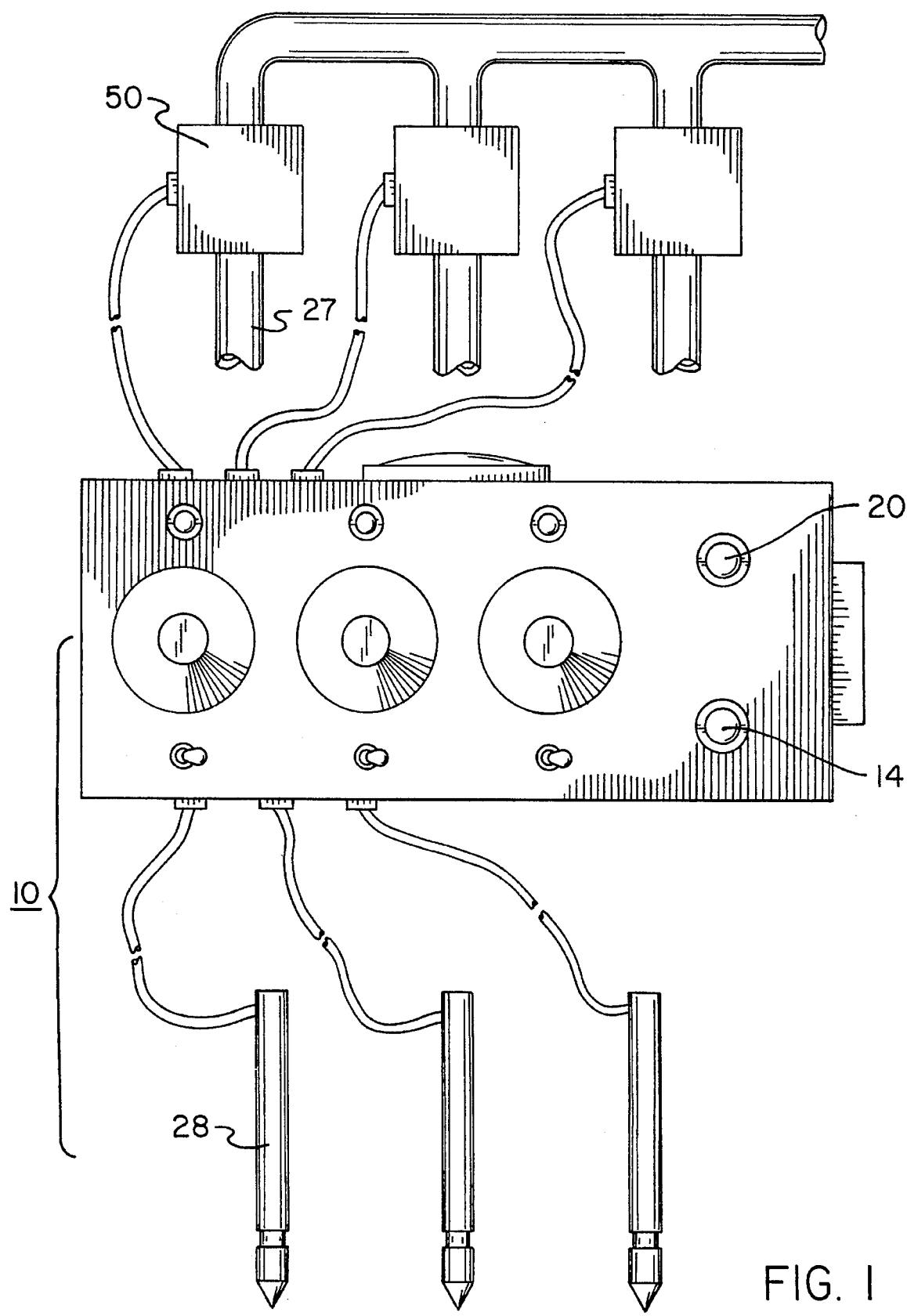
FIG. 1 is a view of the preferred embodiment constructed in accordance with the principals of the present invention coupled to a plurality of sprinkler lines and within a control box of a conventional water sprinkler system.
Figure 2:
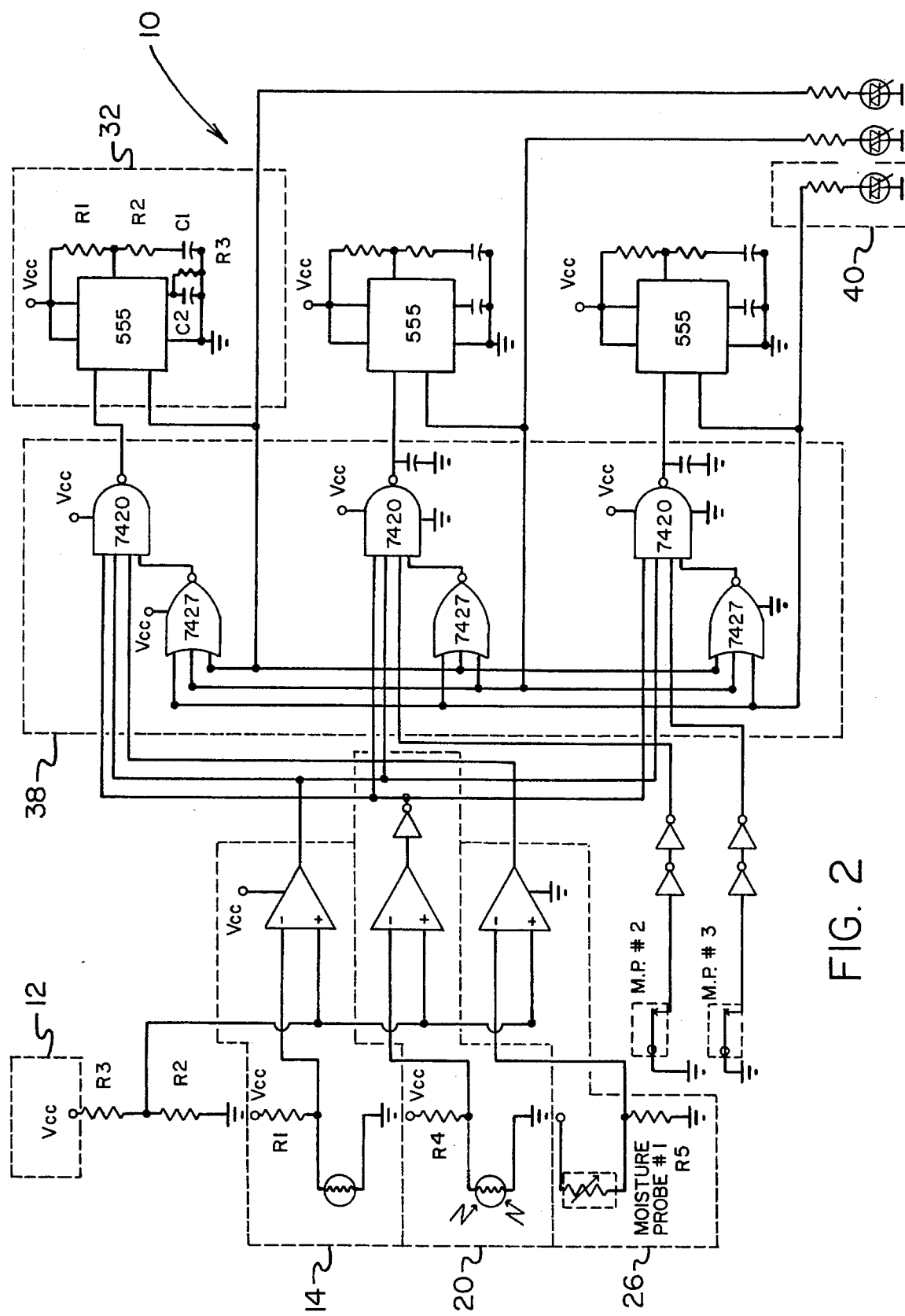
FIG. 2 is a schematic diagram of the present invention. In this instance, the present invention is used for controlling three sprinkler lines as shown in FIG. 1. Moisture probe number 2 and moisture probe number 3 are generally depicted. They have the same structure as moisture probe number 1. A commercially available power supply is used to energize the present invention.

With reference now to the drawings, and in particular, to FIG. 2 thereof, the preferred embodiment of the new and improved sprinkler system controller embodying the principles and concepts of the present invention and generally designated by the reference number 10 will be described.

Specifically, the present invention includes seven major components. The major components are power supply, temperature sensor, light sensor, moisture probes, timers, conjunctive circuitry, and triacs. These components are interrelated to provide the intended function.

More specifically, it will be noted in the various Figures that the first major component is the power supply 12. The power supply is adapted for supplying electrical energy for the remaining major components of the present invention. The power supply is conventional in structure and commercially available. Essentially, it consists of a line adapted to be coupled to a commercial household source of power extended to a transformer. The output of the transformer is then coupled to a full wave bridge rectifier and associated capacitive network. The output from the comparative network is then fed to a 7805 switching transistor whose output is coupled across another capacitor to define a constant output. This output is rated at 5 volts DC. This voltage is used to actuate the electrical components within each major component.

Figure 5:
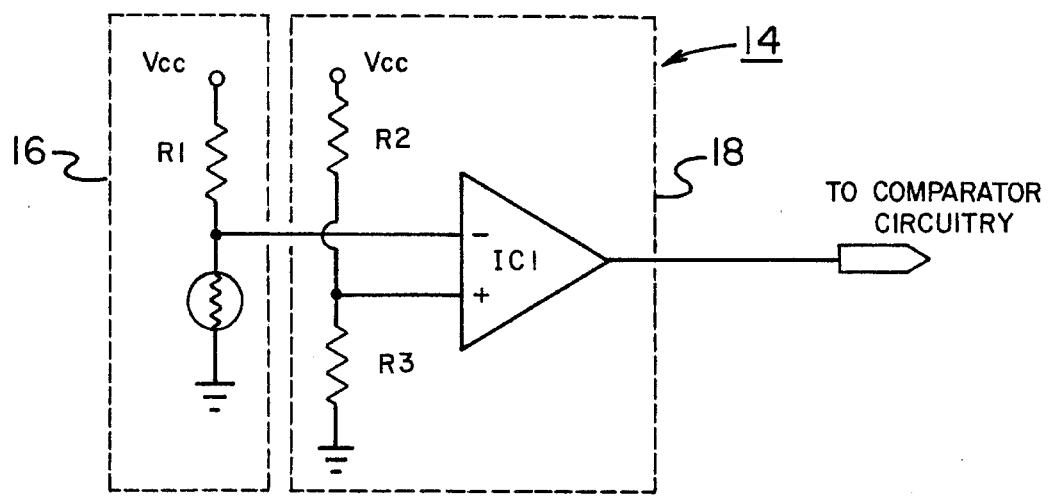
FIG. 5 is an enlarged schematic view of the temperature sensor depicted in FIG. 2.

The second major component is the temperature sensor 14. The temperature sensor is coupled to the power supply 12. The temperature sensor has a thermistor 16 for monitoring air temperature in a ground area to be irrigated. The temperature sensor also has a comparator 18 coupled to the thermistor adapted for transmitting an affirmative temperature indication signal when a given preset temperature recognized by the thermistor is exceeded. The comparator also transmits a non-affirmative temperature indication signal when the temperature as recognized by the thermistor is not exceeded. As shown in FIG. 5, Resistor R1 is about 120 ohms, thereby setting the threshold of the thermistor at 40 degrees Fahrenheit. Resistors R2 and R3 and are each about 1 kilo ohm. Amplifier IC1 is a TLC 274 quad operational amplifier.

Figure 4:
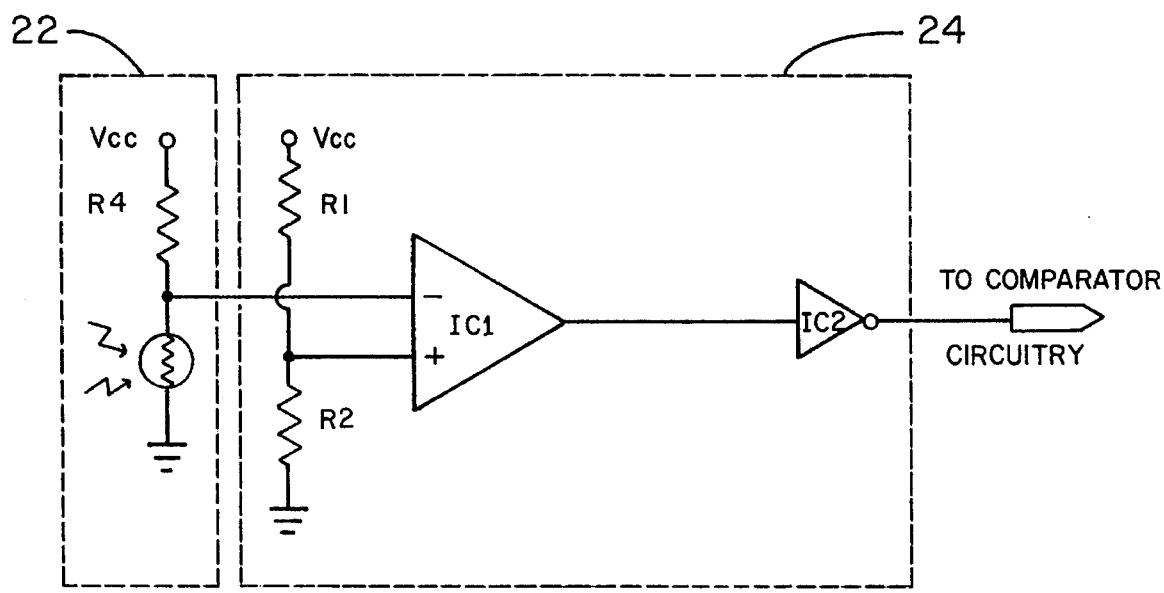
FIG. 4 is an enlarged schematic view of the light sensor depicted in FIG. 2.

The third major component is the light sensor 20. The light sensor is coupled to the power supply 12. The light sensor has a photo detector 22 for monitoring light intensity in a ground area to be irrigated. The light sensor also has a comparator with an associated inverter 24. The comparator followed by the inverter is coupled to the photo detector. The comparator with inverter transmits an affirmative illumination indication signal when a given preset intensity as recognized by the photo detector is not exceeded. The comparator with invertor is also adapted to transmit a non-affirmative illumination indication signal when a given preset intensity as recognized by the photo detector is exceeded. As shown in FIG. 4, resistor R4 is about 380 ohms. Resistors R1 and R2 are each about 1 kilo ohm. Amplifier IC1 is a TLC 274 quad operational amplifier. Inverter IC2 is a 7404 inverter.

Figure 6:
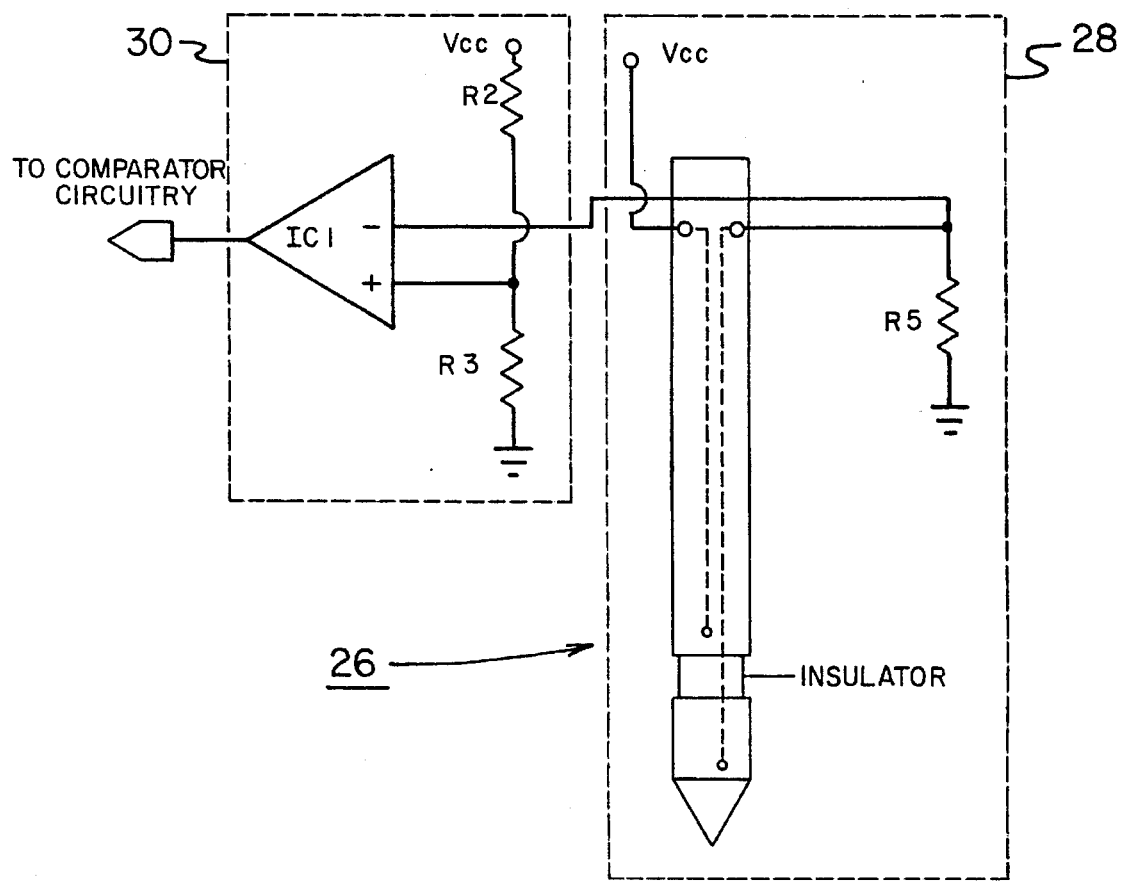
FIG. 6 is an enlarged schematic view of one of the moisture probes depicted in FIG. 2.

The fourth major component is the moisture probes 26. The present invention includes a plurality of moisture probes. Each moisture probe is coupled to the power supply 12. Each moisture probe is also adapted to be positioned near a sprinkler line 27. Each moisture probe has a variable resistor 28 in the form of a stake adapted to be driven into the ground for monitoring moisture in a ground area to be irrigated. Each moisture probe also includes a comparator 30 coupled to the variable resistor. The comparator is adapted for transmitting an affirmative moisture indication signal when a given preset moisture level as recognized by the variable resistor is not exceeded. The comparator is also adapted to transmit a non-affirmative moisture indication signal when a given preset moisture level as recognized by the variable resistor is exceeded. As shown in FIG. 6, Amplifier IC1 is a TLC 274 quad operational amplifier. Inverter IC2 is a 7404 invertor. Resistors R2 and R3 are each about 1 kilo ohm. The stake is a silicone filled stainless steel tube.

Figure 3:
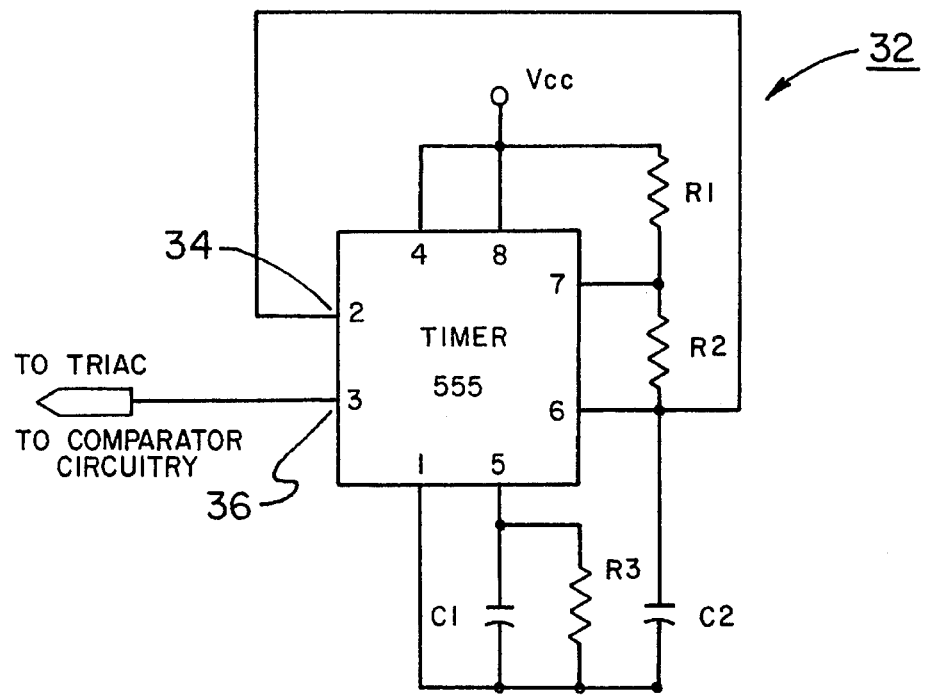
FIG. 3 is an enlarged schematic view of one of the timers depicted in FIG. 2.

The fifth major component is the timers 32. The present invention includes a plurality of timers. Each timer is coupled to the power supply 12. Each timer is used for monitoring a single sprinkler line 27. Each timer has an input 34 and an output 36. Each input is adapted to receive an affirmative timer activation signal. Each output transmits an affirmative sprinkler valve activation signal for a preset period of time as set in the timer upon receipt of an affirmative timer activation signal. Each output of each timer also transmits a non-affirmative sprinkler valve activation signal upon receipt of a non-affirmative timer activation signal. As shown in FIG. 3, a 555 timer is used. Resistor R1 is set at 10 kilo ohms. Resistor R2 is set at 820 kilo ohms. Resistor R3 is set at 33 kilo ohms. Capacitor C1 is set at 1 micro farad. Capacitor C2 is set at 0.01 micro farads. These components are used to set the cycle period of the timer. The resistors could also be replaced with a potentiometer so that the preset period of time could be manually adjusted.

The sixth major component is the conjunctive circuitry 38. The conjunctive circuitry is coupled to the power supply. It is also coupled to the temperature sensor 14, light sensor 20, moisture probes 26, and timers 32. The conjunctive circuitry transmits an affirmative timer activation signal upon receipt of an affirmative temperature indication signal, an affirmative illumination indication signal, and an affirmative indication signal. The output of each timer is also fed back to the input of the conjunctive circuitry. This feedback adds a constraint that no affirmative sprinkler valve activation signal is currently being received on any given line in order for the affirmative timer activation signal to be transmitted. This allows only one sprinkler line to be active at any given time. Thus, water pressure problems do not result due to many lines being active at a single time. This is especially important since in many areas where sprinkler systems are used, water pressure is low. Therefore, only one line should be operable at a time.

The seventh major component is the triacs 40. The present invention includes a plurality of triacs. Each triac is coupled to the power supply 12. Each triac is also coupled to a separate solenoid valve on a separate water line. Each triac transmits an affirmative sprinkler line activation signal when an affirmative sprinkler valve activation signal is received. Likewise, when a non-affirmative sprinkler valve activation signal is received, a non-affirmative sprinkler line activation signal is transmitted. The affirmative sprinkler line activation signal is adapted to open a solenoid water valve 50 coupled to a sprinkler line, whereby allowing a sprinkler head coupled to a sprinkler line to disperse water for irrigating an area of ground. The non-affirmative sprinkler line activation signal is adapted to close an opened solenoid water valve coupled to a sprinkler line, whereby preventing a sprinkler head coupled to a water line from dispersing water.

With specific regards to the major components previously discussed, the temperature sensor is made up of a thermistor, and resistor combination. The reference voltage is set by resistors R2 and R3. When the voltage drop on the thermistor reaches the reference voltage the operational amplifier will shut off, otherwise the operational amplifier will stay on. A 7404, is then used to invert the signal to high (affirmative temperature indication signal). With a low signal (non-affirmative temperature indication signal) the system will be disabled and there will be no water.

The light sensor that is made up of a photodetector resistor combination. The reference voltage of the light sensor uses the same reference voltage as the temperature sensor. With light coming into the photodetector it has a low voltage drop, when the light is absent the voltage drop reaches the reference voltage turns off the operational amplifier, the signal is then inverted with a 7404 invertor. This signal needs to be high (affirmative illumination indication signal) to enable the system.

Moisture sensors are coupled to each line. Each is made of a stainless steal tube that is separated at the lower end by an insulator with wires connected to the interior of the tube. This produces a variable resistor. The tube is then filled with silicone to prevent water from getting into the tube and corroding the wires. Resistance is changed by the amount of moisture in the ground. This resistance is compared (that is, the voltage drop) to a reference voltage. If the threshold voltage is reached then the operational amplifier puts out a high signal (affirmative moisture indication signal) which enables that line to receive water. If that line does not reach the threshold voltage, then that line will not receive water.

The signals from the light sensor, temperature sensor, and moisture sensor, are all brought into the conjunctive circuitry consisting of NAND and NOR gates to enable or disable each line. Where there is a high at each output of the 7420, it produces a signal (affirmative timer activation signal) that starts a timer, and subsequently, a sprinkler line. The line will water for 30–36 minutes (this can be varied is using a variable resistor), then the timer will shut off, there is also a feedback line that is disabling the other lines. When the timer is cutoff it enables the next line, if that line has a high (affirmative) on all of its inputs it will also turn on, if not then the next line will be given an opportunity to turn on, if all the inputs are high (affirmative). This system can be added upon which more lines when desired.

The timing circuit for each line is made up of 555 timer, arranging the 555 into a monostable circuit with a time delay of 30–36 minutes (this can be varied by using variable resistors). This will provide enough water for deep watering and will allow the moisture sensor to detect the water in the soil and not allow the line to be enabled until the moisture probe enables the line again.

From the timing device, there is a signal (affirmative sprinkler valve activation signal) that will go to the a triac. The triac is in line with the solenoid valve on the automatic sprinkler valve. When the signal enables (affirmative) the triac the solenoid will open the water valve and that sprinkler line receives water. When the timer is through with its time the signal (non-affirmative sprinkler valve activation signal) will change and the triac is disabled which will close the solenoid and that sprinkler line will not have water. The solenoids on most automatic sprinkler valves uses 24 volts AC. This can be taken from the power supply input into the sprinkler system.

A variety of sprinkler systems and timers exist to help the modern gardener grow and maintain lawns and gardens. The timer portion of these systems is very useful because it allows gardeners to irrigate plants and lawns at regular times even if they cannot be around to turn the system on and off. However, even the benefits of a timer to ensure regular dousing, sprinkler systems still do not provide optimal care for lawns and gardens because they cannot detect when the temperature is too cold or the ground is too wet. The present invention is a new sprinkler system controller designed to eliminate these shortcomings and provide the gardener with optimum benefits derived from proper irrigation of gardens and lawns.

The present invention consists of a timing circuit, a light sensor, a temperature sensor, and a moisture probe. Like existing sprinkler system controllers, the timing circuit determines the length of time a sprinkler system is on and can be adjusted by the user to whatever length of time is needed. The present invention is adapted to be utilized with existing automatic sprinkler piping, sprinkler heads, and solenoid water valves.

However, the light and temperature sensors and the moisture probe provide the present invention with features and versatility not found in other sprinkler systems. The light sensor ensures that the system will not water during daylight hours, if that is what is desired. In some areas during the hot summer, running the sprinkler at midday causes most of the water to evaporate, which is expensive and wasteful. The temperature sensor ensures that the system will not operate on cold damp days, which can make the grass and plants susceptible to mildew or possible freezing.

The moisture probe ensures that the system does not activate unless the soil is dry. This prevents the system from over-watering and eliminates the waste which occurs from unnecessary soaking. With the present invention, anyone can provide their lawn or garden with the correct amount of moisture automatically without waste or fear of over-watering, or running the sprinkler when it is too cold.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A sprinkler system controller for automatically allowing a sprinkler system to irrigate an area of ground comprising, in combination:

a power supply for supplying electrical energy;

a temperature sensor coupled to a power supply, the temperature sensor having a thermistor for monitoring air temperature in a ground area to be irrigated and a comparator coupled thereto for transmitting an affirmative temperature indication signal when a given preset temperature of about 40 degrees Fahrenheit as recognized by the thermistor is exceeded and a non-affirmative temperature indication signal otherwise;

a light sensor coupled to the power supply, the light sensor having a photodetector for monitoring light intensity in a ground area to be irrigated and a comparator with inverter coupled thereto for transmitting an affirmative illumination indication signal when a given preset intensity as recognized by the photodetector is not exceeded and a non-affirmative illumination indication signal otherwise;

a plurality of moisture probes, each in a form of a stainless steel tube filled with silicone, each coupled to the power supply, each having a variable resistor for monitoring moisture in a ground area to be irrigated and a comparator coupled thereto for transmitting an affirmative moisture indication signal when a given preset moisture level as recognized by the variable resistor is not exceeded and a non-affirmative moisture indication signal otherwise;

a plurality of timers each coupled to the power supply, each having an input and an output, each input adapted to receive an affirmative timer activation signal, each output transmitting an affirmative sprinkler valve activation signal for a preset period of time of between about 30 to 36 minutes upon receipt of an affirmative timer activation signal, and each output transmitting and a non-affirmative sprinkler valve activation signal otherwise;

conjunctive means coupled to the power supply and further coupled to the temperature sensor, light sensor, moisture probes, and timers for transmitting an affirmative timer activation signal upon receipt of an affirmative temperature indication signal, an affirmative timer activation signal upon receipt of an affirmative illumination indication signal, and an affirmative timer activation signal upon receipt of an affirmative moisture indication signal with a constraint that no affirmative sprinkler valve activation signal is currently being received in a feedback type mode; and a plurality of triacs, each triac coupled to the power supply and an output of a separate timer, each triac transmitting an affirmative sprinkler line activation signal when an affirmative sprinkler line activation signal is received and a non-affirmative sprinkler valve activation signal otherwise, with the affirmative sprinkler line activation signal adapted to open a solenoid water valve coupled to a sprinkler line, whereby allowing a sprinkler head coupled to the sprinkler line to disperse water for irrigating an area of ground, and with the non-affirmative sprinkler line activation signal adapted to close an opened solenoid water valve coupled to a sprinkler line, whereby preventing a sprinkler head coupled to the sprinkler line from dispersing water.

* * * * *